July 29, 1969

H. A. FAERBER 3,458,058

STACKING MACHINE

Filed May 6, 1966

INVENTOR:
HANS A. FAERBER
ATTORNEY

July 29, 1969

H. A. FAERBER 3,458,058

STACKING MACHINE

Filed May 6, 1966

INVENTOR:
HANS A. FAERBER

ATTORNEYS

July 29, 1969  H. A. FAERBER  3,458,058
STACKING MACHINE

Filed May 6, 1966  7 Sheets-Sheet 4

INVENTOR:
HANS A. FAERBER
ATTORNEYS

July 29, 1969  H. A. FAERBER  3,458,058
STACKING MACHINE
Filed May 6, 1966  7 Sheets-Sheet 5

INVENTOR:
HANS A. FAERBER
ATTORNEYS

INVENTOR:
HANS A. FAERBER
ATTORNEYS

United States Patent Office 3,458,058
Patented July 29, 1969

3,458,058
STACKING MACHINE
Hans Arthur Faerber, Castle Cove, New South Wales, Australia, assignor to Nid Pty. Limited, Alexandria, near Sydney, New South Wales, Australia, a corporation of New South Wales, Australia
Filed May 6, 1966, Ser. No. 548,133
Claims priority, application Australia, Apr. 19, 1966, 4,398/66
Int. Cl. B65g 57/03, 59/02
U.S. Cl. 214—6
5 Claims

ABSTRACT OF THE DISCLOSURE

An article stacking and pallet loading apparatus for receiving successive articles one at a time and forming the articles into vertically arranged stacks. The apparatus includes a group forming mechanism for receiving individual articles from a conveyer and forming the articles into groups each containing a predetermined number of articles vertically stacked from the bottom of the group. A group transfer mechanism transfers the formed groups to a stacking station and deposits successively formed groups one on top of another to complete a stack.

---

This invention relates to the automatic stacking of articles one on top of the other.

It often happens in automatic manufacturing processes that articles are dispensed from a machine one at a time and then have to be stacked to facilitate transport of the articles by conventional materials handling equipment. Thus, stacking machines are known which are able to accept articles one at a time and from them produce a stack of articles.

The invention was devised primarily for application to the stacking of trays dispensed from a so-called Mogul or starch moulding machine for the manufacture of confectionery and is described hereinafter primarily as applied to that purpose.

It will be appreciated however that stacking machines according to the invention may be used in any such instances in which individual articles are to be arranged in a stack.

In use, starch moulding machines are fed with shallow trays one after the other, the trays are then filled with edible starch powder and mould cavities are formed in the surface of the starch which are subsequently filled with a setable liquid confectionery material. At the end of the confectionery manufacturing process the trays emerge from the moulding machine one at a time and are then stacked by a stacking machine for return to the original feed-in point.

It will be appreciated that the starch moulding of confectionery is necessarily carried out at high speed because the finished product has to be sold cheaply and moulding machines have been developed to a stage permitting very high speed operation.

However, hitherto, it has been necessary to limit the speed of operation of confectionery moulding machines to a speed at which prior known stacking machines have been able to accept trays from the moulding machine.

Prior known tray stacking machines have comprised transfer means adapted to accept one tray at a time from the Mogul machine and place it upon the top of a stack of trays and ejector means adapted to eject the stacked trays to a loading station from which the stack may be removed by a fork-lift truck or the like.

When the stack of trays being built reaches its full height it has to be ejected from the stacking machine as aforesaid and as it is preferable for the operation of the Mogul machine to be continuous it has been necessary for the stack to be ejected in a time interval equal to that between the intake of successive trays. Generally speaking, the stack may comprise anything up to 40 or 50 trays and thus it is impracticable to shift the stack from the machine at extremely high speeds because of the likelihood of the stack toppling. Thus, in effect, prior known stacking machines, and therefore Mogul machines discharging trays to them, have been limited to a speed of operation determined not so much by the time necessary to transfer an individual tray from the Mogul machine's feed-out point to the stack being formed but rather by the longer time necessary to eject a stack of trays from the stacking machine.

An object of the present invention is to overcome the above-indicated disabilities of prior known stacking machines.

The invention achieves that object by providing a stacking machine comprising intake means adapted to accept articles one at a time and accommodate a plurality of articles, and transfer means able to transfer said plurality of articles in a single operation from said intake means to a stack being formed; thus the time available for the ejection of a finished stack of articles from the stacking machine is not the time taken for the intake of a single article but rather the longer time available for the intake of a plurality of articles.

The invention consists in a stacking machine adapted to accept articles one at a time and to build a stack thereof characterised in that it comprises intake means able to accept articles one at a time and accommodate a plurality of articles, transfer means able to transfer said plurality of articles in a single operation to a stack being formed and ejector means able to eject the finished stack from the stacking machine.

By way of example, an embodiment of the invention is described hereinafter with reference to the accompanying drawings.

The illustrated stacking machine is adapted to accept trays from a confectionery moulding machine. Those trays are relatively shallow rectangular trays able to be stacked one on top of the other. The transfer means of the illustrated machine are adapted to shift five trays at a time and the intake means of the machine adapted to accommodate five trays; therefore, in the drawings individual trays, or where appropriate, groups of five trays, are shown in light discontinuous lines and are referenced 18 so as to make clear the manner in which the trays are progressed through the machine. The tray references are followed by the letters of the alphabet A, B, C etc. to indicate consecutive positions in the movement of the trays through the machine; and, for descriptive convenience those positions are referred to hereinafter as the "A position," "B position" and so on.

The illustrated machine is adapted to stack the trays upon pallets of the kind often used to support an article or articles to be transferred by forklift trucks or the like. Furthermore, the machine's ejector means is adapted to accept such pallets from a conveyor or the like which may extend to the stacking machine from a tray loading machine. Those pallets are also shown in the drawings in light discontinuous lines and are referenced 19 followed by letters of the alphabet corresponding to those of the tray reference (except that the letter C is omitted as there is no pallet position corresponding to the trays C position).

Briefly, insofar as the trays are concerned, the A position is that of a tray immediately prior to its insertion into the stacking machine's intake means; and the B position is that of the trays accommodated in the intake means; the C position is that of a group of trays being transferred from the intake means to the stack being formed; the D position is that of the stack being formed and the E position is that of the stack when ejected from the machine.

The machine's supporting structure comprises two spaced apart pillars 20 and 21 and a transverse bulkhead 22 extending from one pillar to the other. Each pillar comprises an outer web plate 23 extending for the full height of the pillar, inwardly directed stiffening edge flanges 24 thereon and an inner web plate 25 extending upwardly from the bottom of the pillar for a short distance and forming, with the lower portion of its associated web plate 23, and open-topped box at the foot of each pillar.

Drive transmission devices are provided to effect the synchronised operation of the various operative components of the machine and it will be appreciated that the stacking machine must operate in synchronism with the moulding machine from which the trays 18 are being taken and although synchronised operation may be ensured in a variety of ways it is most simply arranged by providing a mechanical drive connection between the stacking machine and the confectionery moulding machine. Thus, according to the illustrated embodiment of the invention an input shaft 26 may extend from a gear box 27 of the stacking machine to the confectionery moulding machine. The input shaft 26 may connect by gears or otherwise to the drive mechanism of the confectionery moulding machine.

The gear box 27 connects the input shaft 26 to a main drive shaft 28 extending transversely of the stacking machine and being supported at its ends by suitable anti-friction bearings in bearing housings 29 mounted on the respective web plates 23. As will be described later the operative components are all drive-connected to the shaft 28 so that they operate in concert with each other and the moulding machine.

The tray intake means of the illustrated embodiment of the invention are adapted to work in conjunction with a conventional output conveyor of a starch moulding machine comprising slide rails 30 for the support of trays 18A and reciprocating pusher elements (not shown) which positively shift the trays 18A along the slide rails 30 at regular time intervals.

Figure 13:
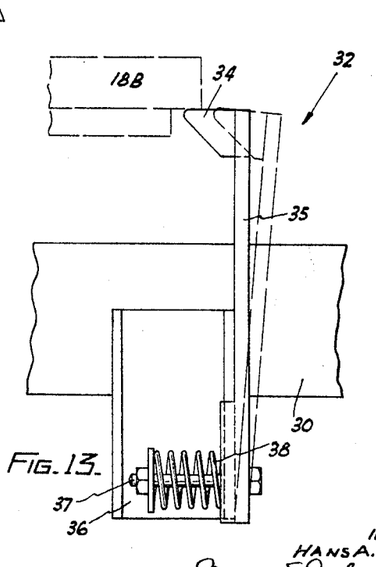
FIGURE 13 is a detail view of a resiliently mounted tray support, being a component of the intake means of the machine of FIGURE 1 and drawn to a larger scale.

The intake means include a tray magazine comprising four upright angle sectioned posts 31 which ensure that trays 18B do not become displaced horizontally but which permit the trays to rise or fall freely, and four retractable tray supports 32 (see FIGURE 13). The intake means also include an upwardly and downwardly movable table 33 adapted to support the trays 18B.

Each of the supports 32 comprises a support lug 34 on an arm 35. Each arm 35 is secured to a bracket 36 on the conveyor 30 by means of a loosely fitting through-bolt 37 which a compression spring 38 sleeved thereon. The compression spring 38 normally ensures that the lugs 34 are disposed with their tips engaged under any trays 18B which may be in the magazine. However, if a tray is forceably lifted by the table 33 the lugs 34 may retract (to the broken line position in FIGURE 13) so that the tray being lifted may ride past the lugs for subsequent retention thereby.

The table 33 is caused to rise and fall by means of cams 39 on the main drive shaft 28, swinging lever type cam followers 40 projecting rigidly from a rock shaft 41, and a parallel linking mechanism comprising an upper swinging link 42, a lower swinging link 43 projecting rigidly from the rock shaft 41 and an upright connecting link 44.

The cams 39 are shaped such that the table 33 falls below the conveyor rails 30 just before the conveyor shifts a tray into the B position and then rises to lift that tray, and any others already in the B position above it, past the lugs 34 for retention thereby as the table falls once again.

After each fifth operation of the intake means as aforesaid the trays 18B are transferred to the stack in the D position by the stacking machine's transfer means. Those transfer means may comprise two endless tranfer chains 45 each riding about a large diameter head sprocket 46 and pairs of smaller foot sprockets 47.

The head sprockets 46 are fixed to a head sprocket shaft 48 which is freely rotatable in anti-friction bearings within bearing housing 49 on the respective web plates 23.

The foot sprockets 47 are mounted upon stub-axles 50 and one of the foot sprockets 47 of each of the chains 45 is drive connected to the drive shaft 28 by means of a first transmission chain 51 riding about sprockets 52 fixed on shaft 28 and sprockets 53 respectively fixedly associated with the driven foot sprockets 47.

It will be seen that each of the transfer chains 45 is disposed with its front upright flight within the transverse centre plane of trays 18B and its back upright flight within the centre plane of the stack 18D.

Each transfer chain 45 carries two carriers 54.

The carriers 54 on each chain are equally spaced apart and the carriers of one chain 45 are in respective horizontal alignment with the carriers of the other chain 45.

Each pair of carriers 54, that is to say, a carrier on one chain and its aligned partner on the other, is adapted to pick up the five trays 18B and deposit those trays on the stack of trays 18D and this process continues automatically for so long as there are trays in the B position.

Each carrier 54 comprises a back plate 55 pivotally attached to an anchorage 56 secured to a link of its associated transfer chain 45.

Throughout most of the straight portions of its travel path each chain 45 runs in substantial channel-sectioned chain guides 57 having grooves (not shown) which co-act with flanges 58 on the anchorages 56 and which in combination with an auxiliary roller 59 on each carrier 54 ensure that during the carrier's upward and downward movement it is constrained to travel without deviating from a substantially straight path and does so without twisting or tilting.

The back-plate 55 of each carrier 54 has pairs of upright mounting flanges 60 projecting from it.

Figure 10:
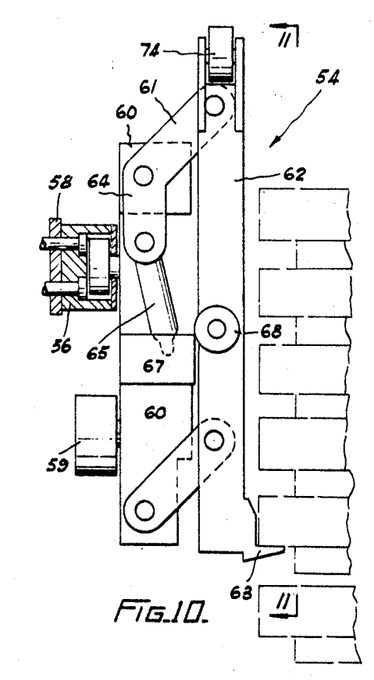
FIGURE 10 is a front elevation of a carrier, being a component of the transfer means of the machine of FIGURE 1, showing the carrier as in use carrying a plurality of trays and drawn to a larger scale.
Figure 11:
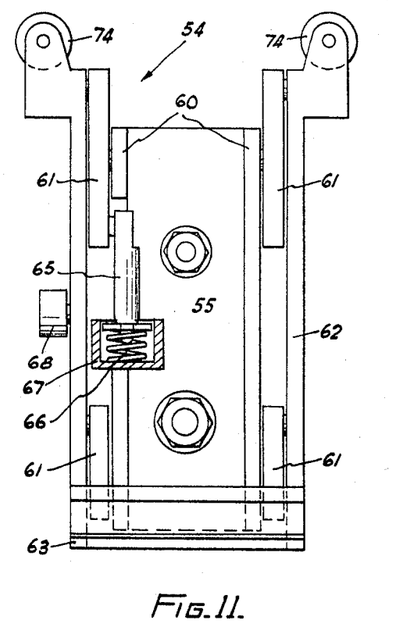
FIGURE 11 is a side elevation of the carrier of FIGURE 10 as seen when viewed in the direction of the arrows 11 appearing thereon and drawn to a larger scale.
Figure 12:
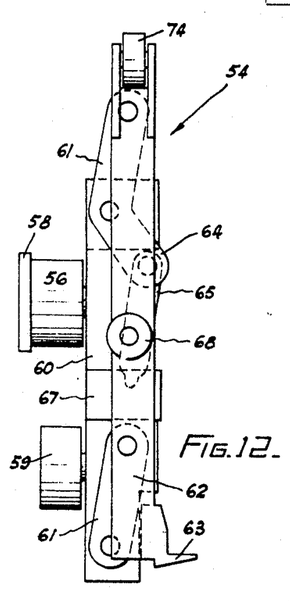
FIGURE 12 is a view similar to FIGURE 10 but showing the carrier of FIGURE 10 in its retracted or out-of-use position.

Four parallel suspension links 61 are pivoted to the mounting flanges 60 and to the upright arms of a U-shaped hook-piece 62 having a tray lifting flange 63 projecting from it. One of the links 61 has a lever arm 64 extending at an angle from it and pivotally connected at its free end to a strut 65 which is upwardly loaded at all times by a compression loading spring 66 in a spring housing 67. The spring 66, strut 65 and arm 64 constitute an overcentre toggle mechanism having two positions of stability; one as shown in FIGURE 10 where the hook element is projected for the carriage of trays and the other as shown in FIGURE 12 where it is retracted. Assuming for the moment that the hook-pieces are projected, than a pair of rollers travelling upwardly with the front flight of the transfer chains 45 will pick up trays 18B and carry them over the head pulleys 46. As that pair of carriers 54 descend with the back flight of the transfer chains 45 those trays are deposited upon the top of the stack 18D and immediately thereafter the hook flanges 63 contact the former top-most tray in the stack which causes the hook-pieces to retract very quickly into the retracted position so enabling the carriers 54 to travel downwardly beside the trays 18D without fouling them.

As the retracted carriers rise to pick up a further five trays 18B, rollers 68 on the carrier hook-pieces 62 contact fixed strikers 69 on the chain guides 57 which serve to push the hook elements into the projected positions.

For preference, upwardly movable rails 70 are mounted above the head pulleys 46 which are rigidly supported by means of cantilevers 71 extending from an upright connecting link 72 connecting two, swinging, parallel links 73. Those rails 70 serve to steady the carriers 54 as they travel from one flight of the chain path to the other and for preference the carriers 54 have pairs of track rollers 74 to contact the rails 70.

The ejector means of the example of the invention now being described comprise a reciprocating pusher frame 75 comprising a cross-bar 76 and two longitudinally extending pallet transfer bars 77.

The pallet transfer bars 77 extend longitudinally of the machine and run partly within channel-sectioned pallet slide rails 78 secured to the floor, or to the machine structure, or to the confectionery moulding machine with which the stacker is to be used. The slide rails 78 are such that the pallets 19 may slide on them from one position to the other as they travel through the machine.

The transfer bars 77 may slide on the lower flanges of the slide rails 78 but for preference transfer bar supporting rollers 79 are provided to reduce the frictional restraint on the movement on the transfer bars 77.

Resiliently mounted pallet pusher pawls 80 are provided at intervals on the transfer bars 77.

Figure 1:
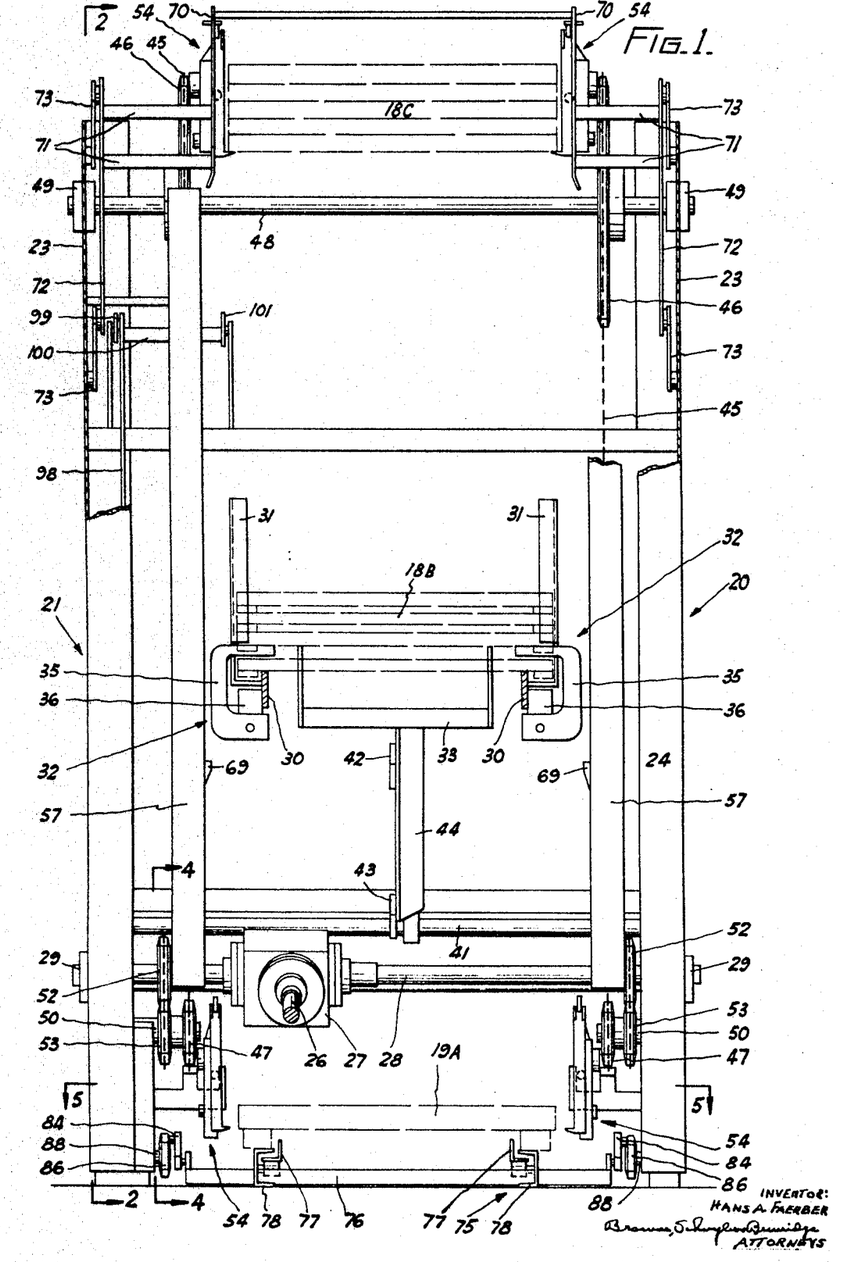
FIGURE 1 is a semi-diagrammatic front elevation of a stacking machine according to the invention.
Figure 2:
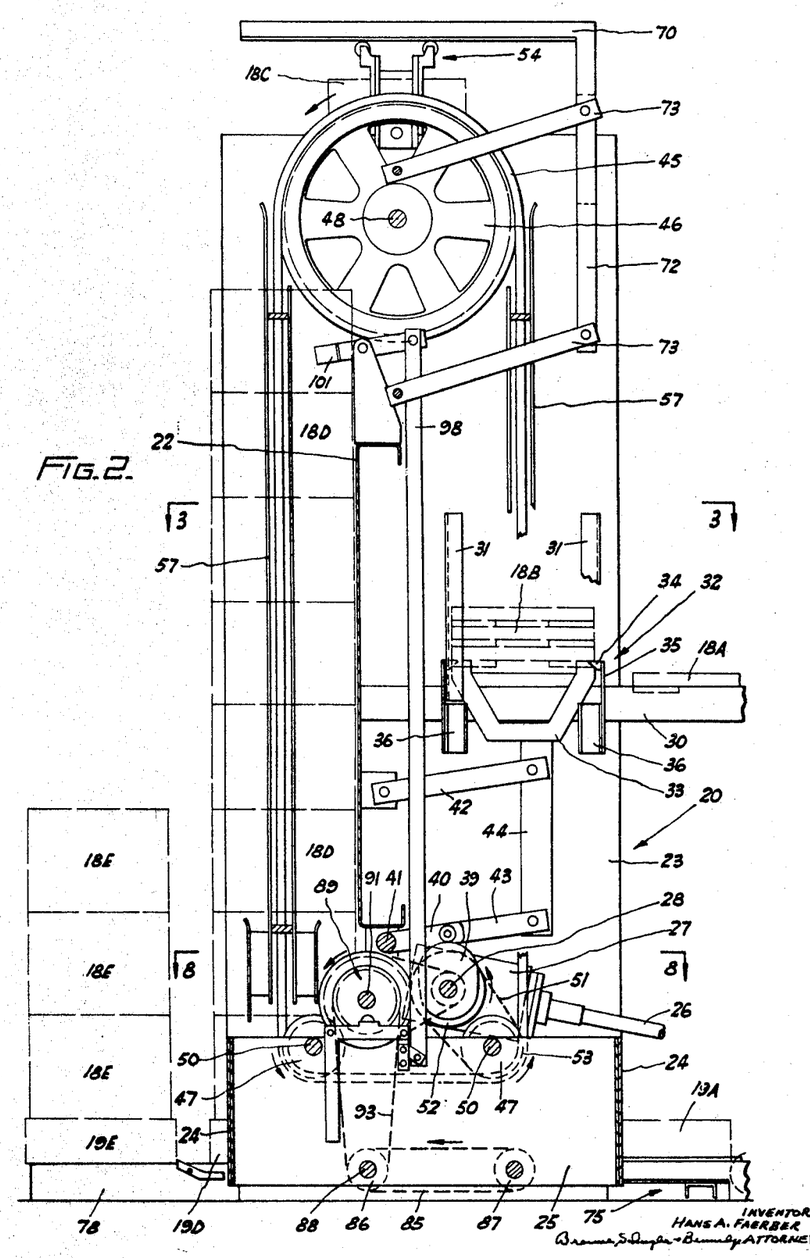
FIGURE 2 is a semi-diagrammatic side elevation of the machine of FIGURE 1.
Figure 3:
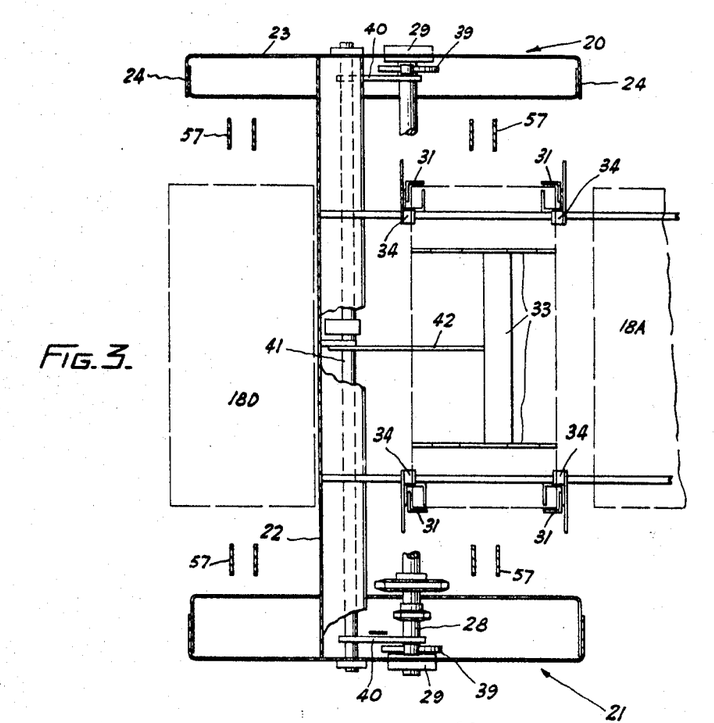
FIGURE 3 is a semi-diagrammatic plan view taken on line 3—3 of FIGURE 2.
Figure 4:
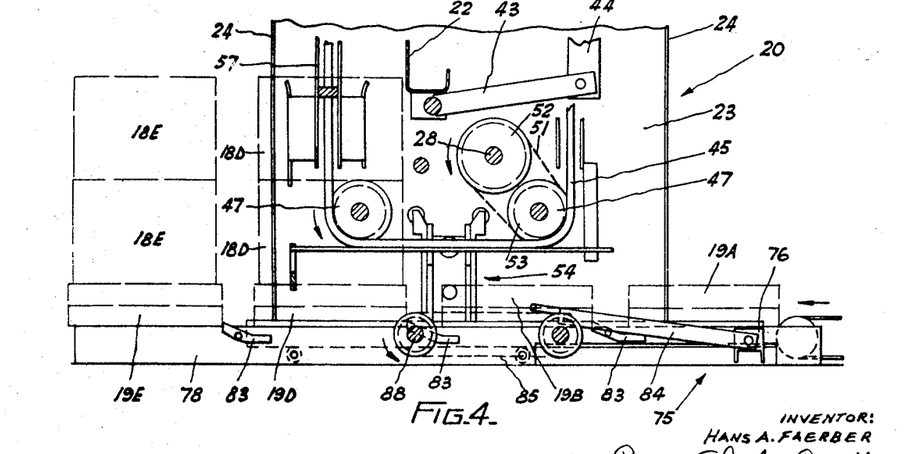
FIGURE 4 is a semi-diagrammatic sectional view taken on line 4—4 of FIGURE 1.
Figure 5:
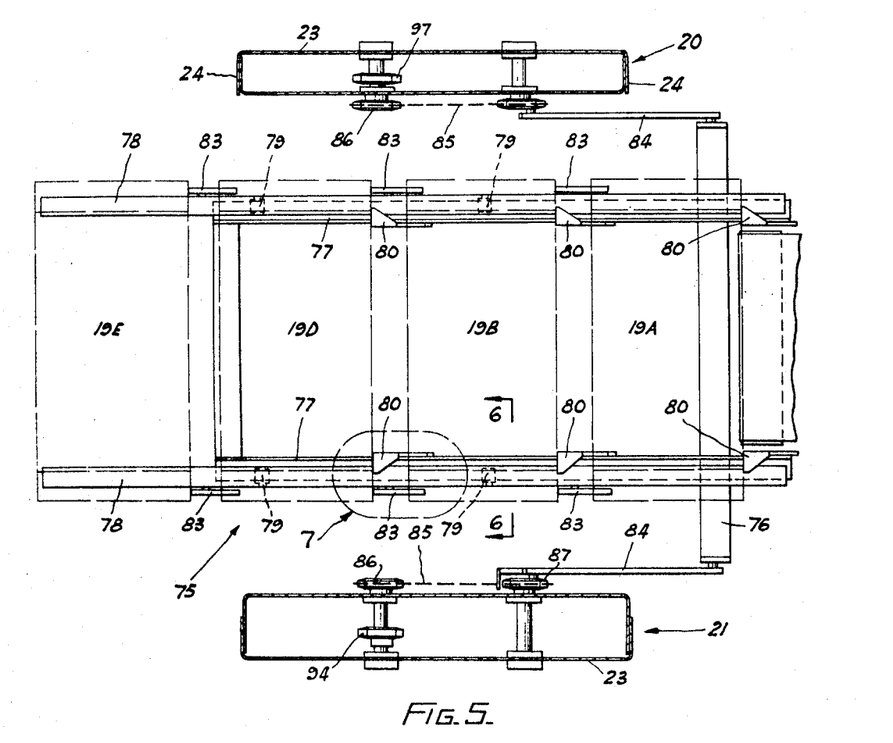
FIGURE 5 is a semi-diagrammatic sectional plan view taken on line 5—5 of FIGURE 1.
Figure 6:
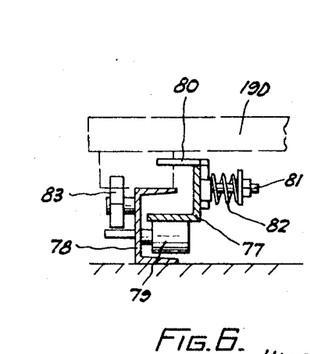
FIGURE 6 is a sectional detail view taken on line 6—6 of FIGURE 5 and drawn to a larger scale.
Figure 7:
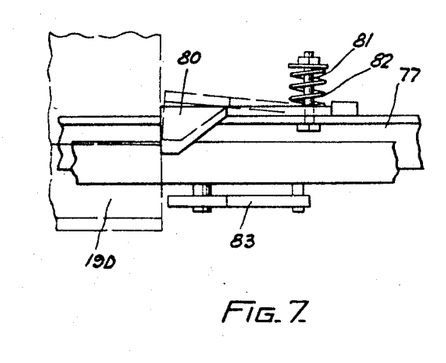
FIGURE 7 is an enlarged detail view of that portion of FIGURE 5 within the broken line enclosure marked 7 appearing therein.
Figure 8:
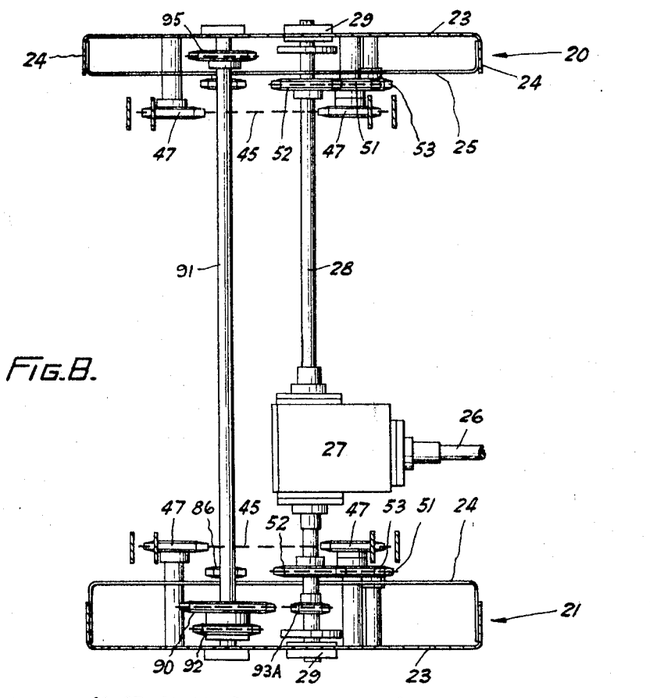
FIGURE 8 is a semi-diagrammatic sectional plan view taken on line 8—8 of FIGURE 2.
Figure 9:
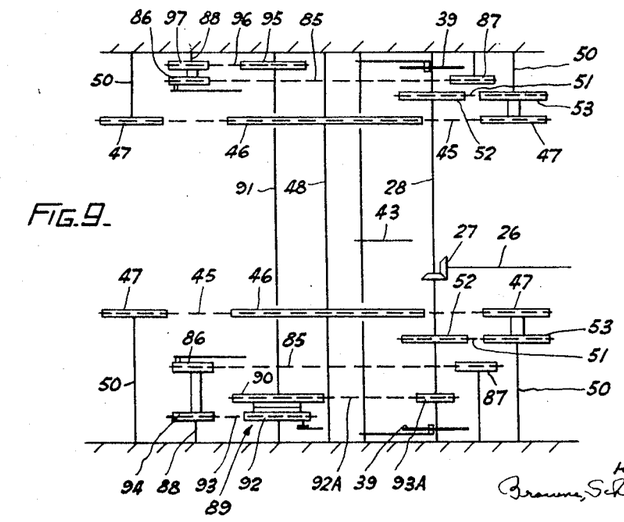
FIGURE 9 is a diagrammatic plan view illustrating the drive transmission means of the machine of FIGURE 1.

As can best be seen in FIGURES 6 and 7 each pusher pawl 80 may be resiliently mounted as aforesaid by means of a bolt 81 extending through a loosely fitting hole in the pawl 80 and a compression spring 82 sleeved on the bolt 81. The arrangement is such that on a forward or inward movement of the transfer bars 77 the pawls 80 engage the pallets 19 so that the pallets move forwardly with the transfer bars 77. However, on the return stroke of the transfer bars 77 the pawls 80 swing aside so as to ride past the pallets 19.

The successive positions of the pallets 19 are defined by means, for example, of gravity operated non-return pawls 83 over which the pallets 19 may ride during the forward movement but which prevent the pallets 19 from returning with the transfer bars 77 on their return stroke.

It will be apparent from the foregoing that the stroke of the reciprocating movement of the pusher frame is slightly in excess of the distance between successive pallet positions and that each reciprocation of the frame will shift the pallets and any trays which may be on them from one position to the next.

In the drawings the pusher frame 75 is shown as just having commenced its forward stroke.

The reciprocating motion of the pusher frame 75 is effected by means of two connecting rods 84 extending from the respective ends of the cross-bar 76 to anchorages on pusher frame drive chains 85 riding upon sprockets 86 and 87 respectively. The sprockets 86 are fixed upon rotatable stub-shafts 88, the sprockets 87 may be similarly mounted or they may be freely rotatable upon fixed axles. The drive chains 85 are themselves driven by drive transmission devices connecting them to the main drive shaft 28 and including a single revolution clutch 89. That is to say, a clutch which unless acted upon by external triggering or clutch operating devices automatically disengages its driven element from its driving element upon the completion of a single revolution following an initial engagement of the clutch.

Such clutch triggering devices are provided which ensure that as soon as the stack of trays 18D reaches the predetermined maximum height that the clutch 89 is engaged for sufficient time to effect one complete revolution of the drive chains 85.

The clutch 89 comprises a sprocketed driving element 90 which is free to rotate upon a clutch support shaft 91 and is permanently drive connected by means of a second transmission chain 92A to a sprocket 93A on the main drive shaft 28. The clutch 89 has a sprocketed driven element 92 which is fixed on the rotatable shaft 91 and is connected by means of a third transmission chain 93 to a sprocket 94 fixed to the stub shaft 88 of one of the sprockets 86. At the end of the clutch support shaft 91 remote from the clutch 89 a sprocket 95 corresponding to the clutch's driven element 92 is connected by a fifth transmission chain 96 to a sprocket 97 fixedly associated with the other sprocket 86. Thus, when the driving and driven elements of the clutch 89 are locked together both of the pusher from drive chains 85 are connected to the main drive shaft 28.

A pull rod 98 extends downwardly from an arm 99 extending rigidly from a fulcrum spindle 100 of a trip-lever 101. The tip of the trip-lever 101 adjacent to the back flight of the nearby transfer chain 45 is positioned so as to be struck and moved downwardly by the roller 68 of a carrier 54 passing by the trip-lever 101 if the carrier is in its retracted position. If the carrier is not retracted as it passes the trip-lever 101 then its roller 68 misses the trip-lever 101. Thus, once the stack of trays 18D reaches a sufficient height so that the trays of a carrier 54 are deposited thereon before that carrier's roller 68 reaches the trip-lever 101 the pull rod 98 will be moved upwardly as the carrier passes by. Such upward movement of the pull rod 98 operates the remaining components of the clutch triggering mechanism to engage the clutch.

Figure 14:
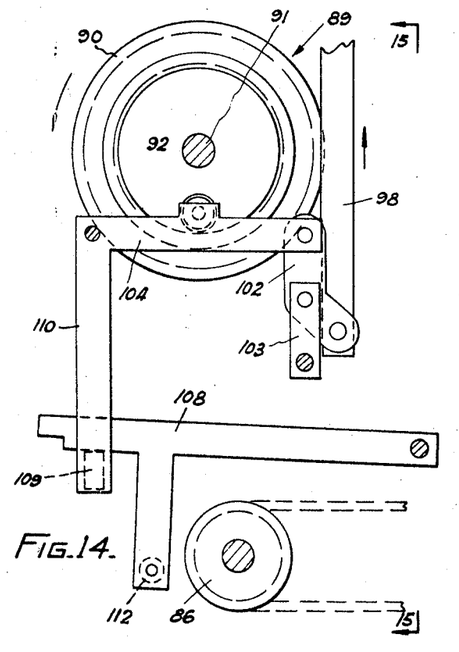
FIGURE 14 is an enlarged detail view of a clutch and portion of a clutch triggering mechanism, being components of the machine of FIGURE 1.
Figure 15:
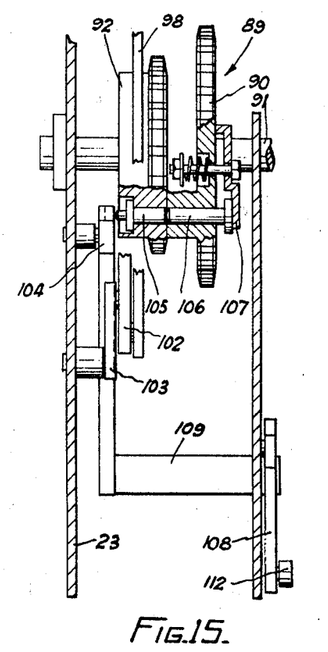
FIGURE 15 is a partly sectioned view of the clutch and triggering mechanism of FIGURE 14 taken on line 15—15 of that figure.
Figures 16, 17:
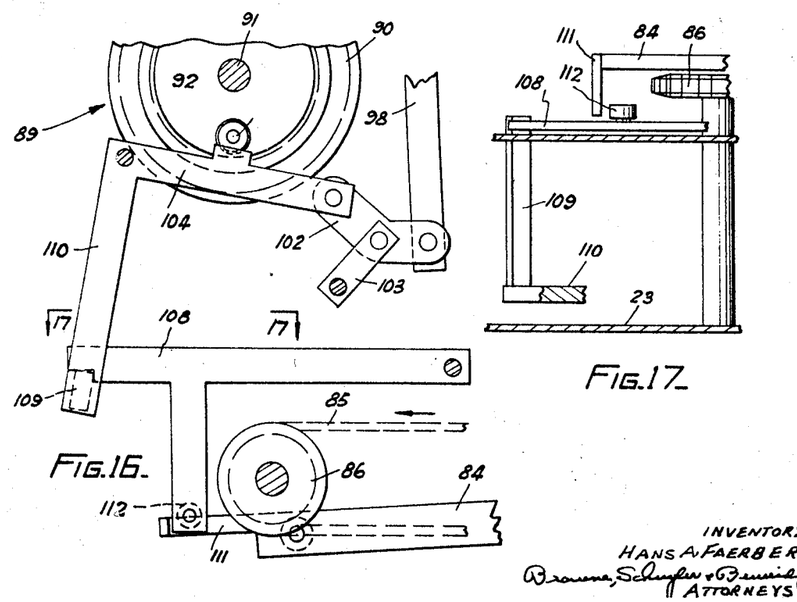
FIGURE 16 is a view similar to FIGURE 14 showing the clutch triggering mechanism in its operating position.
FIGURE 17 is a detail sectional view taken on line 17—17 of FIGURE 16.

Thus, upward movement of the pull rod 98 is transmitted to one end of a bell crank 102 and due to the effect of a control link 103 the opposite end to the bell crank 102 moves downwardly and to the left (as seen in FIGURES 14 and 16) and so swings a pivotedly mounted clutch release lever 104 clear of a clutch push rod 105.

When the clutch release lever 104 is swung clear of the clutch push rod 105 a key pin 106 may be shifted by means of a spring loaded rocker arm 107 so that it partially displaces the clutch push rod 105 if and when the push rod 105 and key pin 106 come into coaxial alignment. In that event, the key pin 106 extends from the driving element 90 into the driven element 92. Thus, when the clutch release lever 104 is swung aside, the driving element 90 becomes locked to the driven element 92 as soon as the key pin 106 next happens to come into axial alignment with the clutch push rod 105.

There is only one push rod 105 but, for preference, there are 2, 3 or more key pins 106, each with its associated rocker arm 107 at equally spaced intervals around the periphery of the driving element 90.

According to other embodiments of the invention a single revolution of its clutch is sufficient to cause a reciprocation of the pusher frame but in the illustrated embodiment of the invention the sizes of the various sprockets in the drive mechanism are such that two revolutions of the clutch 89 are required for that purpose. Therefore, a weight operated latch 108 is provided which, when the clutch release lever 104 is swung aside as aforesaid drops to engage an abutment 109 on an arm 110 projecting from the release lever 104 thereby to hold the release lever clear of the clutch push rod 105. Shortly after the start of the return stroke of the pusher frame 75 a finger 111 (see FIGURE 16) on one of the connecting rods 84 rides under a roller 112 on the latch 108 and thus lifts the latch from the abutment 109 and allows the release lever 104 to swing back into position. At that time the clutch has commenced its second revolution, at the end of which the push rod 105 contacts a sloping face on the release lever 104 and is moved into the driven element 92 so causing it to become disengaged from the driving element 90.

It will be appreciated that the above-described embodiment of the invention has been described purely by way of example and that the invention extends to all designs wherein article intake means are provided for the initial accumulation of a plurality of articles received one at a time and wherein the transfer means transfer that plurality of articles to the stack being formed in a single operation.

In particular those components of the ejector mechanism serving to progress pallets through the machine to receive the articles being stacked would necessarily be modified in design to suit the design of pallets involved and if no pallets are to be used the ejector means would be correspondingly simplified.

The illustrated embodiment of the invention provides for purely mechanical devices to effect the concerted operation of the various operative components of the machine but it will be appreciated that electrical control gear or pneumatic control gear of conventional kind may be used to initiate and effect the movements of the various components in the necessary sequence.

For example the single revolution clutch may be solenoid operated by means of suitably positioned limit switches adapted to sense that a carrier at a predetermined height is in its retracted position. Alternatively the clutch may be pneumatically operated by way of pilot valves able to sense that condition. The transfer means may take any suitable form, for example, the endless transfer chain and their pulleys could be replaced by a pair of large "Ferris wheels" with carriers secured to their peripheries.

Finally, the ejector means and/or the intake means may be electrically or pneumatically operated by operating mechanisms under the control of the machine from which the articles are emanating.

I claim:

1. An article stacking apparatus comprising, in combination, conveyor means for conveying articles one at a time to an article intake station, article grouping means at said intake station for receiving said articles one at a time for said conveyor means and arranging said articles into successive groups each containing a predetermined number of vertically stacked articles, said article grouping means including elevator means for lifting the articles to permit the formation of said groups by stacking articles from the bottom, transfer means movable between said article intake station and a stacking station, said transfer means being operable to transfer successively formed groups from said elevator means to said stacking station and to stack said successive groups on top of one another to form a vertical stack containing a predetermined number of said groups, said transfer means including, a pair of transfer chains riding on spaced apart pairs of coaxial pulleys disposed and driven such that each chain has an upwardly moving front flight and a downwardly moving back flight with the front flight of one transfer chain parallel to and spaced from the front flight of the other and with the back flight of said one transfer chain parallel to and similarly spaced from the back flight of the other and at least one pair of carriers, one on each chain and in horizontal alignment each to each, adapted to pick up said plurality of articles from the intake means disposed between the front flights and subsequently to deposit said plurality of articles on to the top of a stack of articles disposed between said back flights, and ejector means for removing the completed stack from said stacking station.

2. A stacking machine according to claim 1 wherein each said carrier comprises a back plate pivoted to its associated transfer chain, a U-shaped hook-piece disposed with its arms substantially upright and having a tray lifting flange projecting from it, at least one pair of parallel suspension links supporting said hook-piece from the back plate and an over-centre toggle mechanism providing two positions of stability, one in which the hood-piece is projected for the pick-up and transfer of said plurality of articles and another in which the hook-piece is retracted.

3. A stacking machine according to claim 2 wherein said ejector means are put into operation to eject a stack of articles by means of drive transmission devices including a single revolution clutch and clutch triggering mechanism responsive to the height of the stack being formed.

4. A stacking machine according to claim 3, wherein said clutch triggering mechanism is adapted to respond as aforesaid by detecting the presence of a descending retracted carrier at a predetermined height as it travels downwardly with the back flight of its transfer chain.

5. An article stacking apparatus comprising, in combination, conveyor means for conveying articles one at a time to an article intake station, article grouping means at said intake station for receiving said articles one at a time from said conveyer means and arranging said articles into successive groups each containing a predetermined number of vertically stacked articles, said article grouping means including an article magazine, and retractable supporting lugs for supporting a plurality of articles in said magazine, and elevator means for lifting the articles to permit the formation of said groups by stacking articles from the bottom, said elevator means including a supporting table mounted for vertical movement between an elevated and a retracted position, and means moving said table between said elevated and retracted positions to force successive articles past said supporting lugs into said magazine, transfer means movable between said article intake station and a stacking station, said transfer means being operable to transfer successively formed groups from said elevator means to said stacking station and to stack said successive groups on top of one another to form a vertical stack containing a predetermined number of said groups and including means for engaging and lifting a group of articles vertically upward from said magazine, transferring the removed group of articles to a position above said stacking station, and lowering the group to deposit it at said stacking station, and ejector means for removing the completed stack from said stacking station.

References Cited

UNITED STATES PATENTS

| | | | |
|---|---|---|---|
| 1,462,510 | 7/1923 | Lister | 198—225 |
| 1,615,250 | 1/1927 | Wilcox | 214—6 |
| 2,144,821 | 1/1939 | Twomley | 214—6 X |
| 2,266,170 | 12/1941 | Currie | 214—6 |
| 2,924,342 | 2/1960 | St. Jean et al. | 214—6 |
| 2,946,465 | 7/1960 | Raynor. | |
| 2,937,482 | 5/1960 | Lazott et al. | 214—6 X |
| 2,984,838 | 5/1961 | Parker | 214—6 X |
| 3,107,793 | 10/1963 | Frank | 214—6 |
| 3,176,858 | 4/1965 | Johnson | 214—6 |

FOREIGN PATENTS

| | | |
|---|---|---|
| 1,211,986 | 3/1966 | Germany. |

OTHER REFERENCES

German printed application 1,133,308, July 12, 1962.

GERALD M. FORLENZA, Primary Examiner

ROBERT J. SPAR, Assistant Examiner